United States Patent
Wan (10) Patent No.: US 10,374,948 B2
(45) Date of Patent: Aug. 6, 2019

(54) SUPPORTING MOBILITY AND MULTI-HOMING IN THE TRANSPORT LAYER INSIDE END-HOSTS

(71) Applicant: Tao Wan, Ottawa (CA)

(72) Inventor: Tao Wan, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/654,819

(22) Filed: Jul. 20, 2017

(65) Prior Publication Data

US 2019/0028386 A1 Jan. 24, 2019

(51) Int. Cl.
| | |
|---|---|
| *H04L 12/721* | (2013.01) |
| *H04L 12/707* | (2013.01) |
| *H04L 29/12* | (2006.01) |
| *H04L 29/08* | (2006.01) |

(52) U.S. Cl.
CPC .............. *H04L 45/44* (2013.01); *H04L 45/24* (2013.01); *H04L 61/25* (2013.01); *H04L 61/35* (2013.01); *H04L 61/6063* (2013.01); *H04L 67/16* (2013.01)

(58) Field of Classification Search
None
See application file for complete search history.

(56) References Cited

U.S. PATENT DOCUMENTS

| | | | |
|---|---|---|---|
| 7,672,288 B1 | 3/2010 | Iartym | |
| 8,705,471 B2* | 4/2014 | Zhao | H04L 29/12028 370/329 |
| 8,750,301 B2* | 6/2014 | Hu | H04L 45/50 370/390 |
| 9,367,514 B2* | 6/2016 | Jung | H04L 69/161 |
| 9,647,923 B2* | 5/2017 | Subramanian | H04L 45/02 |
| 2003/0014503 A1* | 1/2003 | Legout | G06F 21/10 709/219 |
| 2007/0300290 A1* | 12/2007 | Shay | H04L 63/0428 726/3 |
| 2010/0208742 A1* | 8/2010 | Kafle | H04L 29/12066 370/401 |
| 2010/0217876 A1* | 8/2010 | Fikouras | H04L 69/16 709/228 |
| 2015/0016306 A1 | 1/2015 | Masini et al. | |

(Continued)

FOREIGN PATENT DOCUMENTS

| | | |
|---|---|---|
| CN | 1297662 A | 5/2001 |
| CN | 1801764 A | 7/2006 |

OTHER PUBLICATIONS

A Mobile TCP Socket by Xun Qu, Jeffery Xu Yu and Richard P. Brent. The Australian National University, 1997.

*Primary Examiner* — Michael J Moore, Jr.

(57) ABSTRACT

A method, in a node of a network, of establishing a transport layer connection with another node of the network. The method comprises: sending, by the node, a first permanent identifier of the transport layer connection to the other node, the first permanent identifier being independent of at least an IP-address of the node; receiving, by the node, a second permanent identifier of the transport layer connection from the other node, the second permanent identifier being independent of at least an IP-address of the other node; and associating, by the node, the first and second permanent identifiers with a transport layer identifier of the transport layer connection.

10 Claims, 5 Drawing Sheets

(56) References Cited

U.S. PATENT DOCUMENTS

2015/0236954 A1* 8/2015 Cheng .................. H04L 45/742
370/229
2017/0070419 A1* 3/2017 Singhal .................. H04L 45/20
2018/0375967 A1* 12/2018 Pithawala ............. H04L 69/162

* cited by examiner

SUPPORTING MOBILITY AND MULTI-HOMING IN THE TRANSPORT LAYER INSIDE END-HOSTS

FIELD OF THE INVENTION

The present invention pertains to the field of Communication networks, and in particular to supporting mobility and multi-homing in the transport layer inside end-hosts.

BACKGROUND

The Open Systems Interconnection model (OSI model) is a conceptual model that characterizes and standardizes the communication functions of a telecommunication or computing system without regard to its underlying internal structure and technology. The OSI model partitions a communication system into abstraction layers. The original version of the model defined seven layers.

The OSI model is hierarchical, in that a layer serves the layer above it and is served by the layer below it. For example, a layer that provides error-free communications across a network provides the path needed by the layer(s) above it, and uses the next lower layer to send and receive packets that are transported through that path.

Layer-4 of the OSI model is also referred to as the Transport Layer, and provides host-to-host communication services for applications. It provides services such as connection-oriented data stream support, reliability, low control, and multiplexing. A well-known transport layer protocol is Transmission Control Protocol (TCP). TCP is used for connection-oriented transmissions, whereas the connectionless User Datagram Protocol (UDP) is used for simpler messaging transmissions. TCP is the more complex protocol, due to its stateful design incorporating reliable transmission and data stream services. Other prominent protocols in this group include Datagram Congestion Control Protocol (DCCP) and Stream Control Transmission Protocol (SCTP).

Other conceptual models for characterizing and standardizing the communication functions of a telecommunication or computing system are known. Some of these conceptual models utilize a layered hierarchy, while others do not. However, in all cases, the network model provides functionality corresponding to that of the OSI layer-4 Transport layer. Accordingly, it will be appreciated that references in the present disclosure to the OSI layer-4, or layer-4 functions, are not strictly limited to the OSI model, but instead also apply to equivalent conceptual abstractions and functionality in other networking models. Similarly, references in the present disclosure to TCP connections and messages shall be understood to refer to transport layer connections and messages defined under any suitable layer 4 protocol.

This background information is provided to reveal information believed by the applicant to be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

Accordingly, an aspect of the present invention provides a method, in a node of a network, of establishing a transport layer connection with another node of the network. The method comprises: sending, by the node, a first permanent identifier of the transport layer connection to the other node, the first permanent identifier being independent of at least an IP-address of the node; receiving, by the node, a second permanent identifier of the transport layer connection from the other node, the first permanent identifier being independent of at least an IP-address of the other node; and associating, by the node, the first and second permanent identifiers with a 5-tuple identifier of the transport layer connection.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
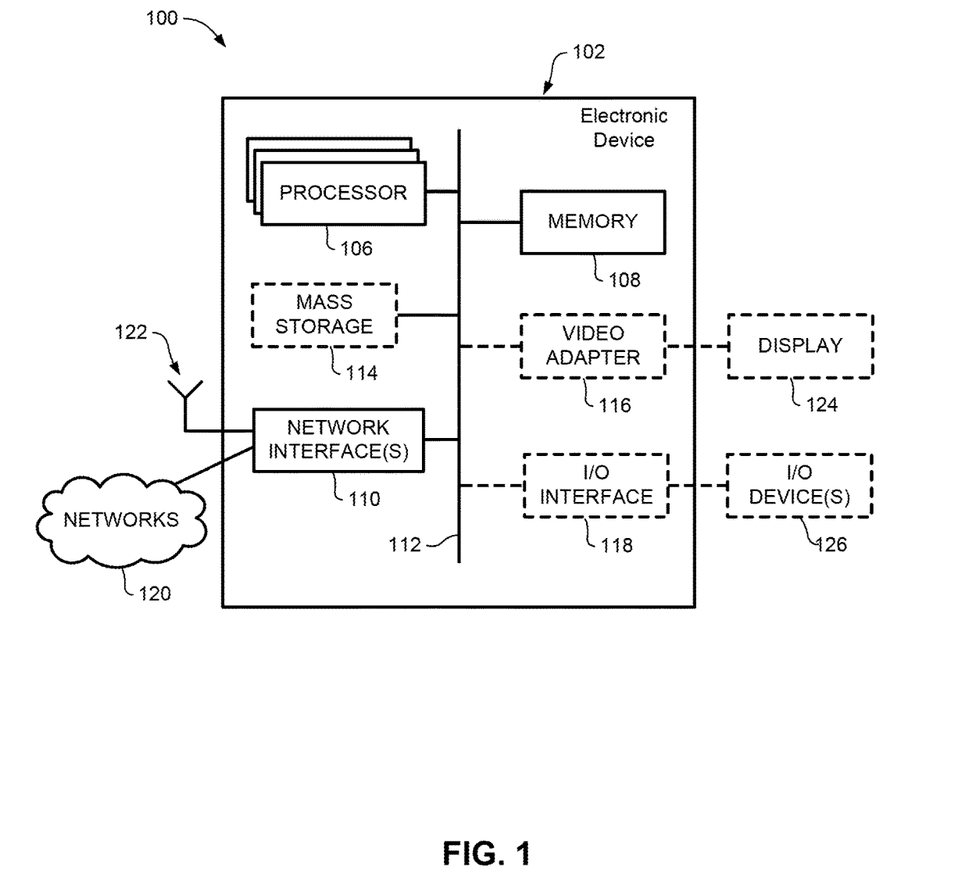
FIG. 1 is a block diagram of an electronic device 52 within a computing and communications environment 50 that may be used for implementing devices and methods in accordance with representative embodiments of the present invention.

FIG. 1 is a block diagram of an electronic device (ED) 102 illustrated within a computing and communications environment 100 that may be used for implementing the devices and methods disclosed herein. In some embodiments, the electronic device 102 may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the electronic device 2 may be a device that connects to network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (m2m) device), or another such device that may be categorized as a UE despite not providing a direct service to a user. In some references, an ED 102 may also be referred to as a mobile device (MD), a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 106, such as a Central Processing Unit (CPU), and may further include specialized processors such as a Graphics Processing Unit (GPU) or other such processor, a memory 108, a network interface 110 and a bus 112 to connect the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs. The bus 112 may be one or more of any type of several bus architectures including a memory bus or memory controller, a peripheral bus, or a video bus.

The electronic device 102 may also include one or more network interfaces 110, which may include at least one of a wired network interface and a wireless network interface. As illustrated in FIG. 1, network interface 110 may include a wired network interface to connect to a network 120, and also may include a radio access network interface 122 for connecting to other devices over a radio link. When ED 102 is network infrastructure, the radio access network interface 122 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 122 may be present and it may be supplemented by other wireless interfaces such as WiFi network interfaces. The network interfaces 110 allow the electronic device 102 to communicate with remote entities such as those connected to network 120.

The mass storage 114 may comprise any type of non-transitory storage device configured to store data, programs, and other information and to make the data, programs, and other information accessible via the bus 112. The mass storage 114 may comprise, for example, one or more of a solid state drive, hard disk drive, a magnetic disk drive, or an optical disk drive. In some embodiments, mass storage 114 may be remote to the electronic device 102 and accessible through use of a network interface such as interface 110. In the illustrated embodiment, mass storage 114 is distinct from memory 108 where it is included, and may generally perform storage tasks compatible with higher latency, but may generally provide lesser or no volatility. In some embodiments, mass storage 114 may be integrated with a memory 108 to form an heterogeneous memory.

The optional video adapter 116 and the I/O interface 118 (shown in dashed lines) provide interfaces to couple the electronic device 102 to external input and output devices. Examples of input and output devices include a display 124 coupled to the video adapter 116 and an I/O device 126 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and Video Adapter 116 may be virtualized and provided through network interface 110.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2:
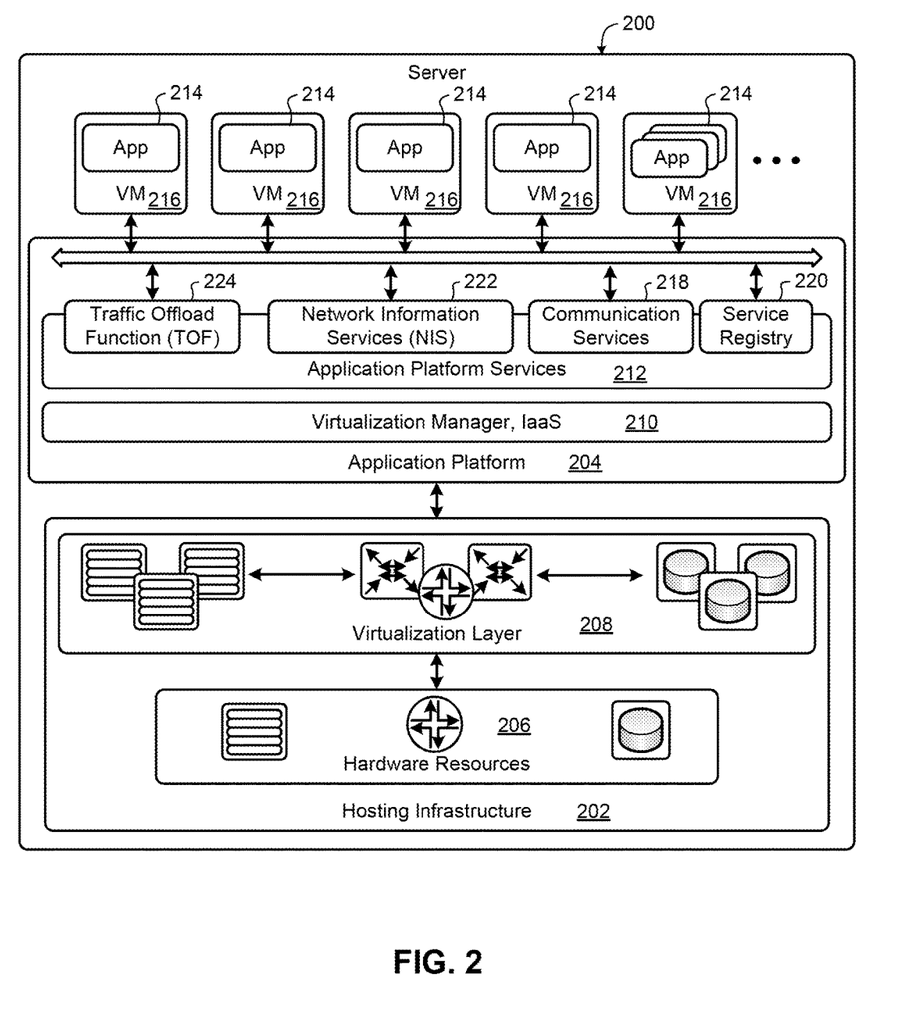
FIG. 2 is a block diagram illustrating a logical platform under which an Electronic Device can provide virtualization services.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a FIG. showing the physical server hardware is not included in this specification. Rather, the block diagram of FIG. 2 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP).

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) image 216 that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed within a respective Virtual Machine 216. For example, MANagement and Orchestration (MANO) functions and Service Oriented Network Auto-Creation (SONAC) functions (or any of Software Defined Networking (SDN), Software Defined Topology (SDT), Software Defined Protocol (SDP) and Software Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside virtualized mobile network elements in data centers that are used for supporting the processing requirements of the Cloud-Radio Access Network (C-RAN). For example, eNodeB or gNB nodes may be virtualized as applications 214 executing in a VM 216. Network Information Services (NIS) 222 may provide applications 214 with low-level network information. For example, the information provided by MS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 224 in various ways, including: A Pass-through mode where (either or both of uplink and downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

Figure 3:
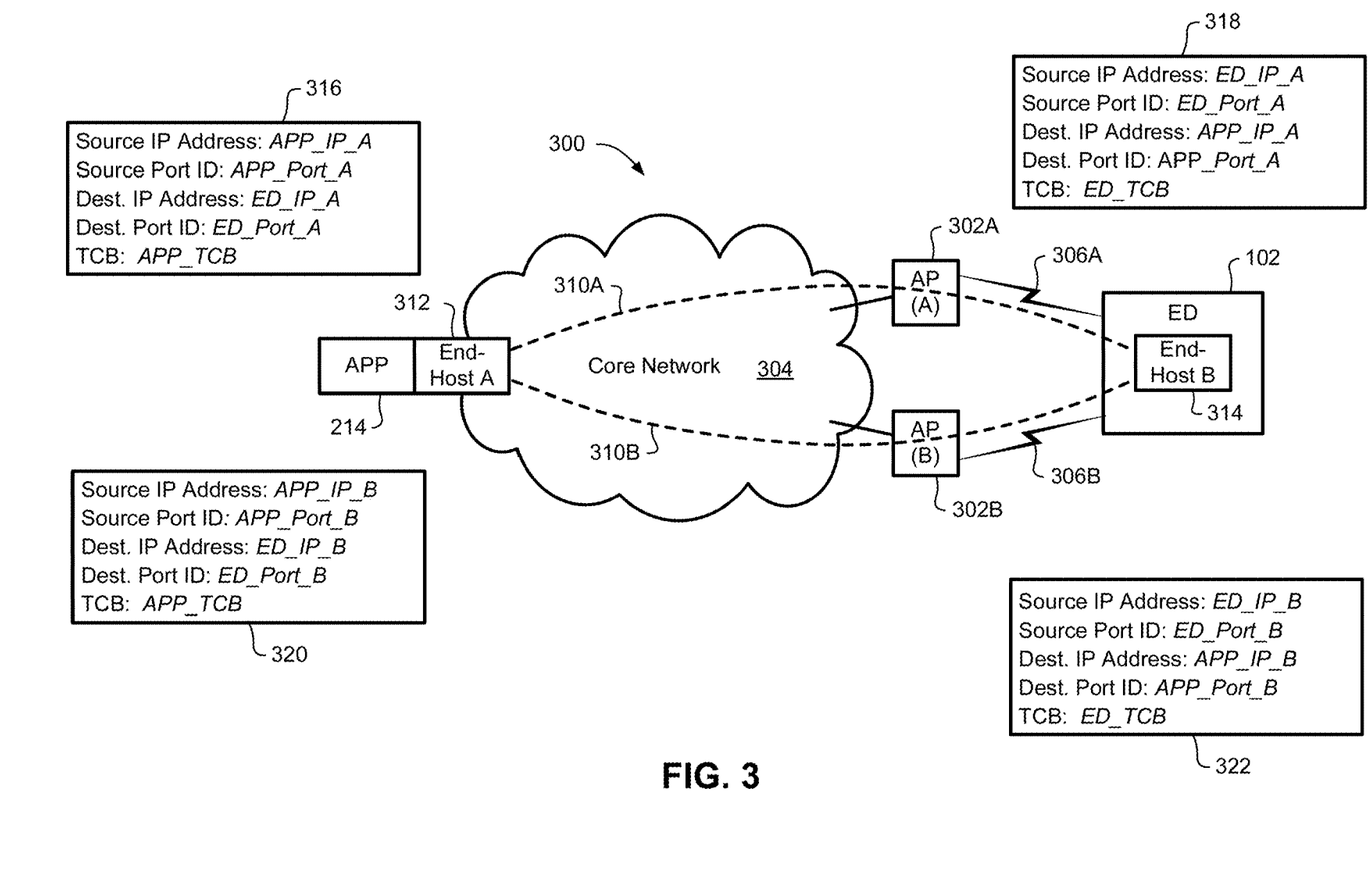
FIG. 3 is a block diagram illustrating elements of a network in which embodiments of the present invention may be deployed.

FIG. 3 is a block diagram schematically illustrating an architecture of a representative network 300 usable in embodiments of the present invention. In some embodiments, the network 300 may be physically implemented as one or more computers, storage devices and routers (any or all of which may be constructed in accordance with the system 100 described above with reference to FIG. 1) interconnected together to form a Wide Area Network, and executing suitable software to perform its intended functions. In other embodiments, some or all of the elements of the network 300 may be virtualized entities instantiated by applications 214 executing in a server environment of the type illustrated in FIG. 2. For this reason, a figure showing the physical network hardware is not included in this specification. Rather, the block diagram of FIG. 3 shows a representative functional architecture of a network 300, it being understood that this functional architecture may be implemented using any suitable combination of hardware and software.

In the example of FIG. 3, the network 300 comprises a pair of Access Points (APs) 302A, 302B connected to a core network 304 which is configured to provide communications and connectivity services to electronic devices 102 connected to the access points 302A, 302B via links 306. In some embodiments, the links 306 may be wireless links between the ED 102 and an antenna 122 (not shown in FIG. 3) associated with network interfaces 110 of each access point 302A, 302B. In embodiments deployed in a Centralized Radio Access network (CRAN) environment, the links 306 may encompass both wireless links and packet fronthaul connections to each access point 302A, 302B. In the 4G or 5G networking environments, the access points 302A, 302B may be provided as eNodeB or gNB nodes, and the core network 304 may be an Evolved Packet Core (EPC) network providing network functions (not illustrated in FIG. 3 for clarity of illustration) such as, for example, a Service Gateway (SGW) 308, a Home Subscriber Server (HSS), an Access and Mobility Management Function (AMF) or its predecessor Mobility Management Entity (MME), a Network Exposure Function (NEF) and a Packet Gateway (PGW). The core network may also include one or more servers 200 hosting one or more service applications 214 such as, for example, mobile edge computing applications. User-Plane packets between the ED 102 and APPs 214 may be transported through TCP connections 310A and 310B extending between an End-Host A 312 associated with the APPs 214 and a corresponding End-Host B 314 associated with the ED 102.

TCP connection 310A facilitates bi-directional packet transport between the End-Hosts 312, 314 via AP(A) 302A, while TCP connection 310B facilitates bi-directional packet transport between the End-Hosts 312, 314 via AP(B) 302B. As may be seen in FIG. 3, each of the Transport layer connections 310A, 310B is identified in the End-Hosts 312, 314 by a respective transport layer identifier which, in the embodiment of FIG. 3 is provided as a 5-tuple comprising: Source IP address; Source port identifier; Destination IP address; Destination port identifier; and a Transport Control Block (TCB). As may be appreciated, the use of a 5-tuple as a transport layer identifier to identify a transport layer connection is typical of Transfer Control Protocol (TCP). Other transport layer protocols may identify connections using a transport layer identifier composed of other combinations of parameters (at least some of which are dependent on lower layer values such as addresses), and so may not use a 5-tuple.

In the example of FIG. 3, the Transport layer connection 310A is identified in End-Host 312 by the 5-tuple 316: Source IP address=APP_IP_A; Source port identifier=APP_Port_A; Destination IP address=ED_IP_A; Destination port identifier=ED_Port_A; TCB=APP_TCB, and in End-Host 314 by the 5-tuple 318: Source IP address=ED_IP_A; Source port identifier=ED_Port_A; Destination IP address=APP_IP_A; Destination port identifier=APP_Port_A; TCB=ED_TCB. Similarly, the Transport layer connection 310B is identified in End-Host 312 by the 5-tuple 320: Source IP address=APP_IP_B; Source port identifier=APP_Port_B; Destination IP address=ED_IP_B; Destination port identifier=ED_Port_B; TCB=APP_TCB, while, this same Transport layer connection 310B is identified in the End-Host 314 by the 5-tuple 322: Source IP address=ED_IP_B; Source port identifier=ED_Port_B; Destination IP address=APP_IP; Destination port identifier=APP_Port_B; TCB=ED_TCB.

Figure 4A:
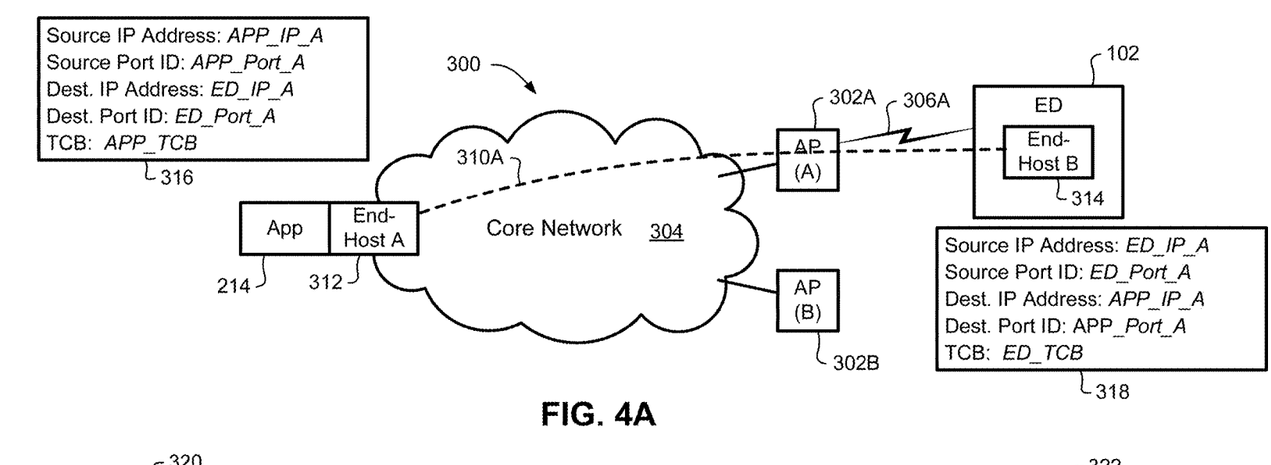
FIGS. 4A and 4B are a block diagram illustrating a mobility use case in the network of FIG. 3.
Figure 4B:
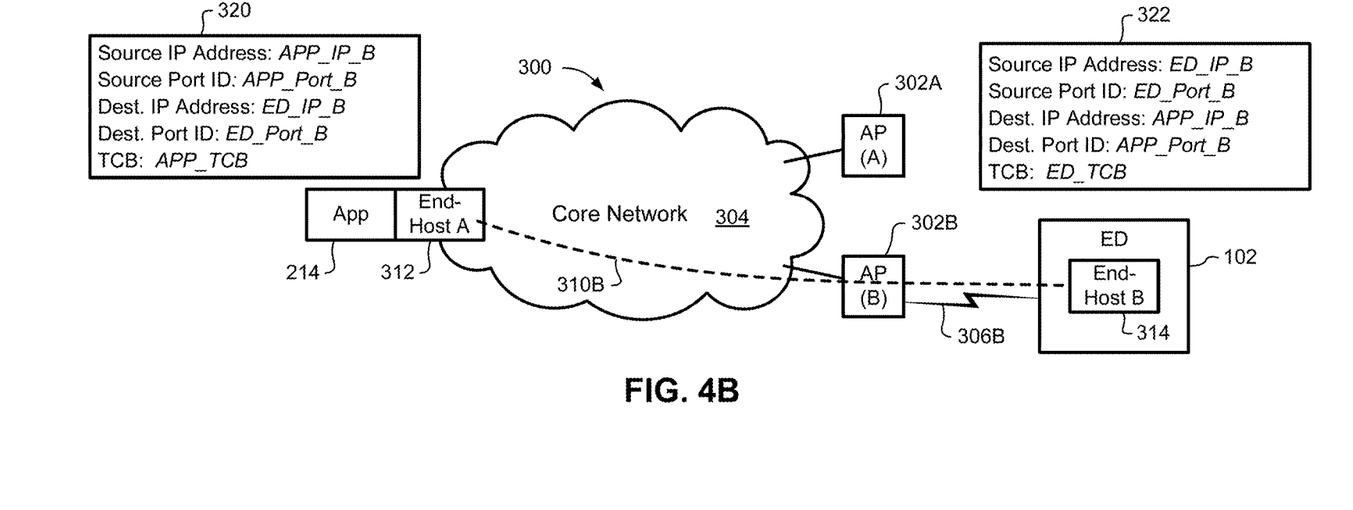

It will be seen that FIG. 3 illustrates an example of "multi-homing" in which the ED 102 is multi homed (in the illustrated example, dual-homed via APs 302A and 302B) on the SGW 308 via the Transport layer connections 310A and 310B. In a static use-case, multi-homing may be used to facilitate load balancing or other traffic engineering purposes. In a mobile use-case, dual-homing may be used during a Hand-Over procedure, for example, as the ED 102 moves from a coverage area of one AP 302 and into the coverage area of another AP 302. FIGS. 4A and 4B illustrate such a scenario, in which the ED 102 is initially connected to AP-A 302A (FIG. 4A), and, following a Hand-Over procedure, is subsequently connected to AP-B 302B (FIG. 4B). During the Hand-Off procedure, the ED 102 will be temporarily connected to both AP-A 302A and AP-B 302B (FIG. 3), and so will be at least transiently dual-homed. The following description will focus on the mobile use-case, it being understood that the present invention is not limited to that use-case.

As may be seen from FIGS. 4A and 4B, the transport layer does not automatically support mobility, because a device (such as ED 102) moving from the coverage area of one AP 302 to the coverage area of a different AP 302 will obtain a new IP address. For example, in the scenario illustrated in FIGS. 4A and 4B, the IP address of ED 102 changes from ED_A IP to ED_B IP when the ED 102 moves from AP(A) 302A to AP(B) 302B. This change in IP address results in the loss of all of the transport layer connection 310A even though all of the other connection parameters may remain unchanged. This lack of mobility support is widely attributed to the fact that the IP address used to identify a device (such as ED 102) at the transport layer is tied to a specific location (typically the Access point 302 to which the ED 102 is connected).

Various proposals have been put forward to separate the device identifier from its location, such as Locator ID Separation Protocol (LISP), as described in RFC6830. In addition, mobile networks such as LTE also introduce Mobility Management Entity (MME) for supporting mobility. However, neither of these approaches directly solves the lack of mobility support at the transport layer. In addition, the introduction of new functions (such as MME in LTE) increases complexity of the network architecture.

A fundamental issue in the lack of mobility support by the transport layer 302 is that in TCP/IP, the transport layer protocols (TCP and UDP) are tied into the lower (i.e. the IP) layer. For example, in the 5-tuple used by TCP to identify a connection, the source and destination IP addresses are obtained from the from the IP layer. Consequently, when either of the source or destination IP addresses change, all TCP connections are lost, even though a device may still have network connectivity after moving to a new location and acquiring a new IP address.

The present disclosure addresses these issues by providing methods and systems in which a unique "permanent identifier" is assigned to a TCP connection at the time it is created, and remains unchanged for the duration of that connection. The permanent identifier provides continuity of the TCP connection identification, so that the 5-tuple connection identifier can change (for example by changing either source or destination IP addresses or ports) without loss of the TCP connection. In this respect, the term "permanent" is defined within the context of the TCP connection. The permanent identifier is assigned at the time that the TCP connection is established, and remains unchanged (i.e. it is "permanent") until the TCP connection is torn down, at which time its permanent identifier may be deleted or reused for another TCP connection, as desired.

In general, any suitable identifier or combination of identifiers may be used as the permanent identifier, provided that the specific permanent identifier used by an End Host for a given TCP connection unambiguously identifies that specific TCP connection among all of the TCP connections supported by the involved End Host. For example, in the example of FIG. 3, the permanent identifier used by End Host A 312 to identify the TCP connection 310A that transits AP(A) 302A must unambiguously identify that specific TCP connection among all of the TCP connections supported by End Host A 312 for at least the duration of that specific TCP connection. In some embodiments, the permanent identifier may be a random value having a predetermined number of bits or characters. In some embodiments, the permanent identifier may be derived from one or more other parameters or values. For example, the permanent identifier may be derived from combination of a MAC address and a time-stamp. In some embodiments, a common permanent identifier may be used at both ends of the TCP connection. For example, a socket identifier associated with the connection may be used as a permanent identifier of the connection, provided that the socket identifier remains unchanged for the life of the connection. In some embodiments, a common permanent identifier may be defined at one end-host, and transmitted to the other end-host which may then use the received permanent identifier to identify the TCP connection. In other embodiments, each end-host may define a respective permanent identifier for its own use to identify the TCP connection. In some embodiments, each end-host may send its respective permanent identifier to the other end-host, which may store the received permanent identifier for use during an update, for example.

Figure 5A:
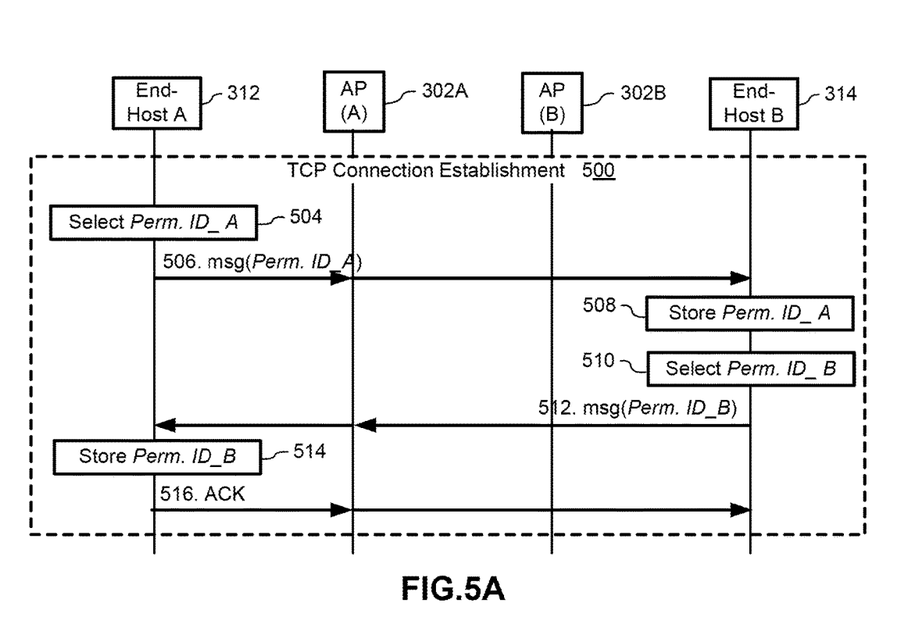
FIGS. 5A and 5B are message flow diagrams illustrating example transport layer connection establishment and modification processes, respectively, in the network of FIG. 3.
Figure 5B:
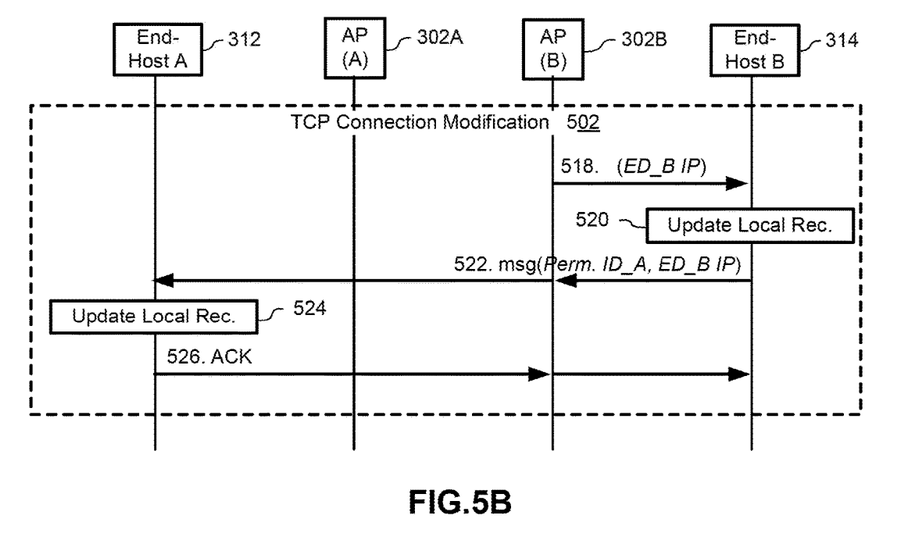

FIGS. 5A and 5B are message flow diagrams illustrating example TCP connection establishment 500 and modification 502 procedures of the type that may be implemented in the network 300 of FIGS. 3 and 4A-B.

As may be seen in FIG. 5A, TCP connection establishment 500 may be initiated at End-Host_A 312, which may select (at 504) a permanent identifier (Perm.ID_A) for the new connection and store it in a local record for the new connection. The End-Host_A 312 may also store an IP address (e.g. APP_IP_A) and a port (e.g. APP_Port_A) in the local record for the connection. The End-Host_A 312 may then send (at 506) a message including the selected permanent identifier (Perm.ID_A) to End-Host_B 314 via its connection 306A to AP_A 302A. In some embodiments, the message may be provided as an extended TCP message such as, for example, an extension of a conventional TCP SYN message. Following receipt of the message and End-Host_A's permanent identifier (Perm.ID_A), the End-Host_B 314 may store (at 508) End-Host_A's permanent identifier (Perm.ID_A) in a local record associated with the new connection. The End-Host_B 314 may also store an IP address (e.g. ED_IP_A) and a port (e.g. ED_Port_A) in the local record for the connection. The End-Host_B 314 may then select (at 510) a permanent identifier (Perm.ID_B) for the new connection, and send (at 512) a message including its selected permanent identifier (Perm.ID_B) to End-Host_A 312. In some embodiments, this second message may also be provided as extended TCP message such as, for example, an extension of a conventional TCP SYN/ACK message. Following receipt of the UPDATE/ACK message and Host-B's permanent identifier (Perm.ID_B), the End-Host_A 312 may store (at 514) Host-B's permanent identifier (Perm.ID_B) in a local record associated with the new connection. The End-Host_A 312 may then send (at 516) an acknowledgment message to End-Host_B 314 to complete a 3-step handshake operation similar to that conventionally used for initiating a TCP connection.

At the conclusion of the processes described above with reference to FIG. 5A, the local record for the connection maintained at End-Host_A 312 will contain the following information:
Permanent ID: Perm.ID_A
Peer_Permanent ID: Perm.ID_B
TCP-ID: {APP_IP_A, APP_Port_A, ED_IP_A, ED_Port_A, APP_TCB}
Similarly, the local record for the connection maintained at End-Host_B 314 will contain the following information:
Permanent ID: Perm.ID_B
Peer_Permanent ID: Perm.ID_A
TCP-ID: {ED_IP_A, ED_Port_A, APP_IP_A, APP_Port_A, ED_TCB}
Referring to FIG. 5B, TCP connection modification 502 may be initiated when any of the parameters of the transport layer connection identifier (e.g. 5-tuple) is changed. As may be appreciated, such a change may occur in either of the end-hosts, in response to any predetermined event. For example, FIG. 5B illustrates an example scenario in which TCP connection modification 502 is initiated in response to the End-Host_B 314 receiving (at 518) a new IP address (ED_IP_B) from AP(B) 302B. This scenario is compatible with the mobility use-case, in which the ED 102 (and thus End-Host_B 314) moves from the coverage area of AP(A) 302A and into the coverage area of AP(B) 302B. It is contemplated that other events may trigger a change of either one or both of the IP address and Port identifier, such as, for example, when switching to a new network interface (such as from 4G to WiFi) or a new network slice, even when the ED remains connected to the same AP 302.

When End-Host_B 314 receives (at 518) the new IP address (ED_IP_B) from AP(B) 302B, End-Host_B 314 may update its local record (at 520) to reflect then new connection parameters. This will result in the local record for the connection maintained at End-Host_B 314 containing the following information:
Permanent ID: Perm.ID_B
Peer_Permanent ID: Perm.ID_A
TCP-ID: {ED_IP_B, ED Port, SGW IP, SGW Port, ED_TCB}
Where the bold characters in the TCP-ID reflect the change made in the TCP connection identifier. The End-Host_B 314 may then forward (at 522) a message including End-Host_A's permanent ID (Perm.ID_A) and End-Host_B's new IP address (ED_IP_B) to End-Host_A 312. The inclusion of End-Host_A's permanent ID (Perm.ID_A) enables End-Host_A 312 to properly identify and retrieve the appropriate local record for the connection. Accordingly, following receipt of the UPDATE message, End-Host A 312 may retrieve and update its local record (at 524) to reflect then new connection parameters. This will result in the local record for the connection maintained at End-Host_A 312 containing the following information:
Permanent ID: Perm.ID_A
Peer_Permanent ID: Perm.ID_B
TCP-ID: {SGW IP, SGW Port, ED_IP_B, ED Port, APP_TCB}
Once the End-Host_A's local record for the connection has been updated, the End-Host_A 312 may send an acknowledgment message to the End-Host_B 314 to complete the connection modification process. As may be appreciated, the connection modification process described above may be used to modify any one or more of the parameters that define the transport layer identifier (such as a TCP 5-tuple(s), for example) of the connection. Furthermore, this process enables the transport layer connection to be modified without have to break the connection and establish a new connection.

As noted above, extended TCP messages such as, for example extended TCP_SYN messages may be used to exchange permanent identifiers during connection establishment (FIG. 5A). In some embodiments, extending the TCP_SYN message may include inserting a flag in the TCP header to indicate the presence of a permanent identifier. For example, a conventional TCP header includes four reserved bits, one or more of which may be used as a flag to indicate that the packet payload includes a permanent identifier for a new connection.

Similarly, extended TCP_SYN messages may be used to exchange new connection identification parameters during connection modification (FIG. 5B). In this case, one or more of the reserved bits may be used as a flag to indicate that the packet payload includes a new parameter(s) to be used in the transport layer identifier of an existing connection (which is identified by the permanent identifier).

As noted above, references in the present disclosure to TCP connections and messages shall be understood to refer to transport layer connections and messages defined under any suitable layer 4 protocol. In specific embodiments, the messages used to exchange permanent identifiers during connection establishment (FIG. 5A) may comprise UDP messages including a UDP payload containing the permanent identifier. In specific embodiments, the messages used to exchange new parameters of a transport layer identifier during connection modification (FIG. 5B) may comprise UDP messages including a UDP payload containing the new parameters.

In specific embodiments, the messages used to exchange permanent identifiers during connection establishment (FIG. 5A) may comprise SCTP messages including an SCTP control chunk containing the permanent identifier. In specific embodiments, the messages used to exchange new parameters of a transport layer identifier during connection modification (FIG. 5B) may comprise SCTP messages including an SCTP control chunk containing the new parameters.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method, in a node of a network, of establishing a transport layer connection with another node of the network, the method comprising:
   sending, by the node, a message including a first permanent identifier of the transport layer connection to the other node, the first permanent identifier being independent of at least an IP-address of the node, wherein the message comprises any one of:
      an extended TCP message including a flag indicating that a payload of the extended TCP message includes the first permanent identifier;
      a UDP message including a UDP payload containing the first permanent identifier: and
      an SCTP message including an SCTP control chunk containing the first permanent identifier;
   receiving, by the node, a second permanent identifier of the transport layer connection from the other node, the second permanent identifier being independent of at least an IP-address of the other node; and
   facilitating, by the node, packet transport with the other node on the basis of the permanent identifiers.

2. The method as claimed in claim 1, wherein the extended TCP message is an extended TCP-SYN message.

3. The method as claimed in claim 1, wherein receiving the second permanent identifier from the other node comprises receiving a message including the second permanent identifier from the other node.

4. The method as claimed in claim 3, wherein the message comprises any one of:
   an extended TCP message including a flag indicating that a payload of the extended TCP message includes the second permanent identifier;
   a UDP message including a UDP payload containing the second permanent identifier: and
   an SCTP message including an SCTP control chunk containing the second permanent identifier.

5. A method, in a node of a network, of modifying a transport layer connection with another node of the network, the method comprising:
   sending, by the node, a message to the other node, the message including:
      a new parameter of a transport layer identifier of the transport layer connection; and
      a respective permanent identifier of the transport layer connection assigned by the other node, the permanent identifier being independent of at least an IP-address of the other node,
   wherein sending the message to the other node comprises sending any one of:
      an extended TCP message including a flag indicating that a payload of the extended TCP message includes the new parameter;
      a UDP message including a UDP payload containing the new parameter; and
      an SCTP message including an SCTP control chunk containing the new parameter.

6. The method as claimed in claim 5, wherein the extended TCP message is an extended TCP-SYN message.

7. The method as claimed in claim 5, wherein the new parameter comprises any one or more of an IP address and a port identifier.

8. A method, in a node of a network, of modifying a transport layer connection with another node of the network, the method comprising:
   receiving, by the node, a message from the other node, the message including:
      a new parameter of a transport layer identifier of the transport layer connection; and
      a respective permanent identifier of the transport layer connection assigned by the node, the permanent identifier being independent of at least an IP-address of the node, wherein receiving the message from the other node comprises receiving any one of:
      an extended TCP message including a flag indicating that a payload of the extended TCP message includes the new parameter;
      a UDP message including a UDP payload containing the new parameter: and
      an SCTP message including an SCTP control chunk containing the new parameter.

9. The method as claimed in claim 8, wherein the extended TCP message is an extended TCP-SYN message.

10. The method as claimed in claim 8, wherein the new parameter comprises any one or more of an IP address and a port identifier.

* * * * *